United States Patent [19]

Karadsheh et al.

[11] Patent Number: 4,970,647

[45] Date of Patent: Nov. 13, 1990

[54] REAR WHEEL STEERING ANGLE CONTROL METHOD

[75] Inventors: Sam M. Karadsheh, Troy; John M. Mackovjak, Romeo; Scott D. Morrison, Rochester; Janet S. Goings, Milford, all of Mich.

[73] Assignee: General Motors Corporation, Detroit, Mich.

[21] Appl. No.: 348,444

[22] Filed: May 8, 1989

[51] Int. Cl.$^5$ ............................................. B62D 6/02
[52] U.S. Cl. ................................ 364/424.05; 180/142; 180/143; 280/91
[58] Field of Search ...................... 364/424.05; 280/91, 280/99; 180/79.1, 140–143

[56] References Cited

U.S. PATENT DOCUMENTS

| | | | |
|---|---|---|---|
| 4,687,214 | 8/1987 | Uno | 280/91 |
| 4,687,216 | 8/1987 | Kawamoto et al. | 280/91 |
| 4,703,822 | 11/1987 | Kawamoto et al. | 280/91 |
| 4,720,790 | 1/1988 | Miki et al. | 280/91 |
| 4,733,878 | 3/1988 | Kanazawa et al. | 280/91 |
| 4,779,693 | 10/1988 | Takahashi et al. | 280/91 |
| 4,782,907 | 11/1988 | Morishita et al. | 180/140 |
| 4,893,688 | 1/1990 | Morishita | 180/79.1 |
| 4,893,825 | 1/1990 | Janson | 280/91 |

Primary Examiner—Gary Chin
Attorney, Agent, or Firm—Mark A. Navarre

[57] ABSTRACT

A rear wheel steering system in which the rear steering command is retrieved from a three dimensional (3D) lookup table as a function of both front wheel steering angle and vehicle speed in normal operating modes, and from a two dimensional (2D) lookup table as a function of front wheel steering angle without regard to the vehicle speed under conditions where the vehicle speed information is deemed not credible. If the measured vehicle speed is judged to be not credible, it is replaced with an estimated or recently measured credible vehicle speed value, and the replacement value is then used in connection with the measured front wheel steering angle signal to retrieve a rear wheel steering command from the 3D lookup table. However, when the front wheels have been returned to the straight ahead position, the rear wheel steering angle command is retrieved from the 2D lookup table as a sole function of the measured front wheel steering angle. When the vehicle speed signal abnormality is corrected and the front wheels are returned to the straight ahead position, the system reverts to the normal operating mode in which the rear steering command is retrieved from the 3D lookup table as a function of both the front wheel steering angle and the measured vehicle speed.

3 Claims, 3 Drawing Sheets

4,970,647

REAR WHEEL STEERING ANGLE CONTROL METHOD

This invention relates to rear wheel steering control systems, and more particularly to a method of operation for determining the desired rear wheel steering angle.

BACKGROUND OF THE INVENTION

Prior rear steering control systems for motor vehicles position the rear wheels primarily in relation to the front wheel steering angle. When the front wheel steering angle is relatively small, it is assumed that parking maneuverability is not critical and the rear wheels are steered in-phase with the front wheels to provide improved stability at cruising speeds. When the front wheel steering angle is relatively large, it is assumed that parking maneuverability is more important and the rear wheels are steered out-of-phase with the front wheels. Some systems, while still controlling the rear steering in relation to the front steering, additionally vary the front/rear steering ratio as function of the vehicle speed.

SUMMARY OF THE PRESENT INVENTION

The present invention is directed to an improved rear wheel steering system in which the rear steering command is retrieved from a three dimensional (3D) lookup table as a function of both front wheel steering angle and vehicle speed in normal operating modes and from a two dimensional (2D) lookup table as a function of front wheel steering angle without regard to the vehicle speed under conditions where the vehicle speed information is suspect. The measured vehicle speed is compared with other measured indications of the vehicle speed (such as engine speed) to determine its credibility.

If the measured vehicle speed is not deemed to be a reliable indicator of vehicle speed, it is replaced with an estimated or recently measured credible vehicle speed value. If the front wheels are being steered, the replacement vehicle speed value is then used in connection with the measured front wheel steering angle signal to retrieve a rear wheel steering command from the 3D lookup table. However, once the measured front wheel steering angle indicates that the front wheels are centered for straight ahead motion of the vehicle, the replacement vehicle speed value is discarded and the rear wheel steering angle command is retrieved from the 2D lookup table as a sole function of the measured front wheel steering angle. When the vehicle signal abnormality is corrected and the measured wheel steering angle indicates that the front wheels are centered for straight ahead motion of the vehicle, the system reverts to the normal operating mode in which the rear steering command is retrieved from the 3D lookup table as a function of both front wheel steering angle and vehicle speed.

DETAILED DESCRIPTION OF THE DRAWINGS

Figure 1:
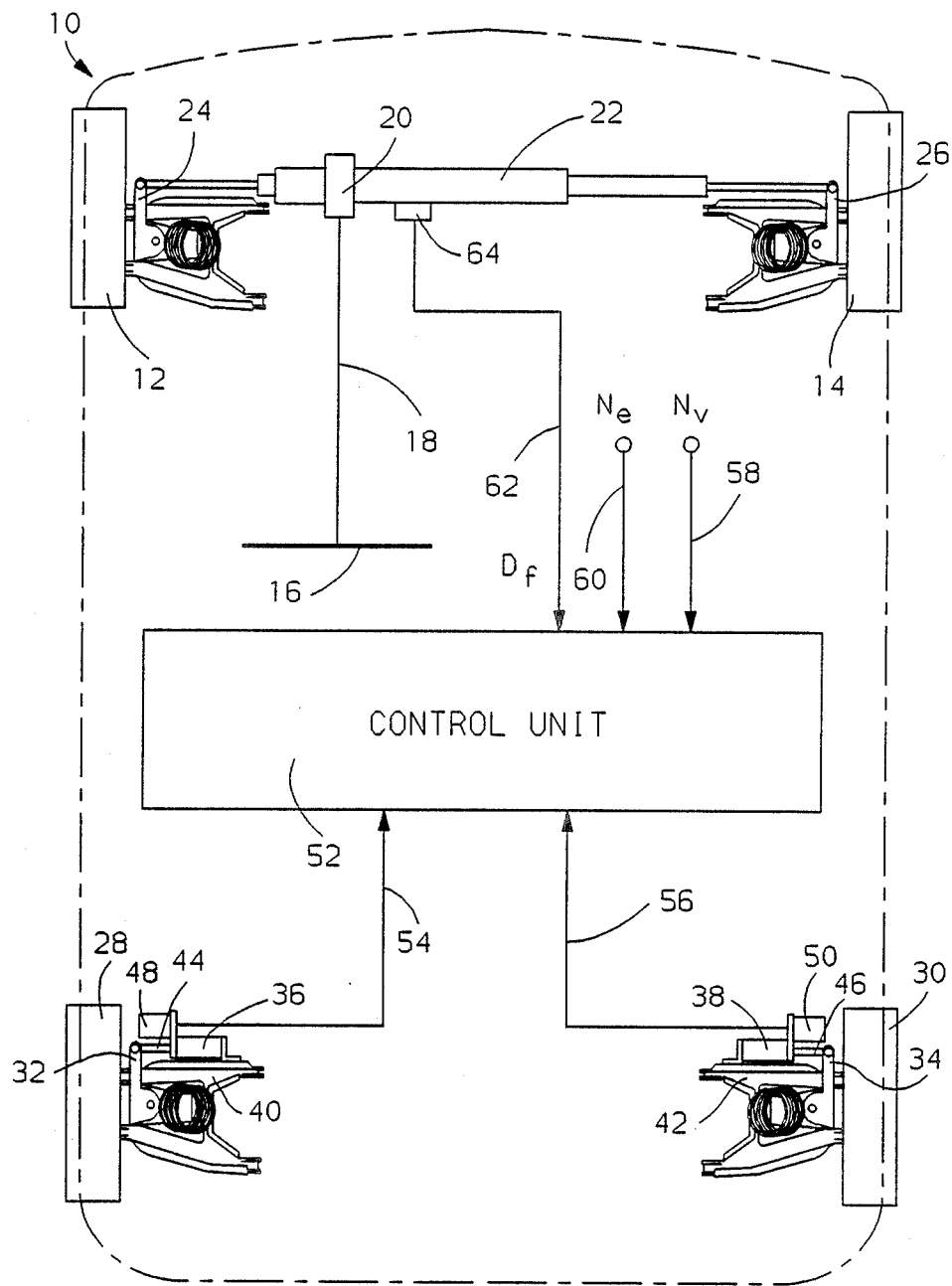
FIG. 1 is a system diagram, including a computer-based control unit, of a rear wheel steering system in accordance with, this invention.

Referring to FIG. 1, the reference numeral 10 generally designates a motor vehicle having four steerable wheels suspended from the vehicle on conventional ball joint mechanisms. The front wheels 12, 14 are steered together in response to rotation of an operator manipulated handwheel 16. The handwheel 16 is mechanically connected via steering column 18 to a pinion gear 20, which is maintained in meshing engagement with teeth formed on a rack member 22. The rack member 22, in turn, is connected to the front wheel steering knuckles 24 and 26, completing the mechanical linkage connecting the front wheels 12, 14 to the handwheel 16. The steering of the front wheels 12, 14 may be assisted by a conventional hydraulic power assist steering system or by an electric power assist system, such as that shown in the U.S. Pat. No. 4,509,611 to Kade et al. issued Apr. 9, 1985, and assigned to the assignee of the present invention.

The rear wheels 28, 30 are also provided with steering knuckles 32, 34 for effecting limited independent positive and negative steering of the same. Each rear wheel assembly includes a linear actuator 36, 38 mounted on a lower control arm 40, 42 and having an output linkage 44, 46 connected to the respective steering knuckles 32, 34. Each such output linkage 44, 46 is axially displaceable by an electric motor 48, 50, operating through a generally conventional ball-screw mechanism (not shown).

The electric motors 48, 50 are energized together to effect coordinated steering of the rear wheels 28, 30 by the computer-based control unit 52 via lines 54, 56. In carrying out such control, electrical signals indicative of vehicle speed $N_v$, engine speed $N_e$ and front wheel steering angle $D_f$ are supplied as inputs to control unit 52 via lines 58, 60 and 62. The vehicle and engine speed signals $N_v$, $N_e$ may be obtained with conventional variable reluctance magnetic speed pickups (not shown), and the front steering angle signal $D_f$ may be obtained with a conventional position sensor 64 responsive to the displacement of rack member 22. Additional position sensors responsive to the displacement of the actuator output linkages 44, 46 may also be provided for control purposes if desired.

Figure 2:
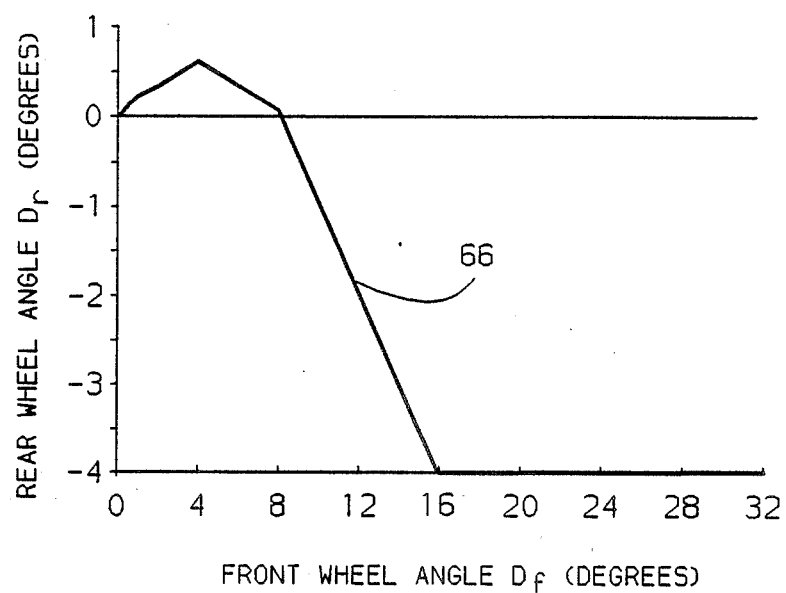
FIGS. 2 and 3 are graphs depicting 2D and 3D lookup tables, respectively, employed according to the invention in the determination of rear wheel steering commands.
Figure 3:
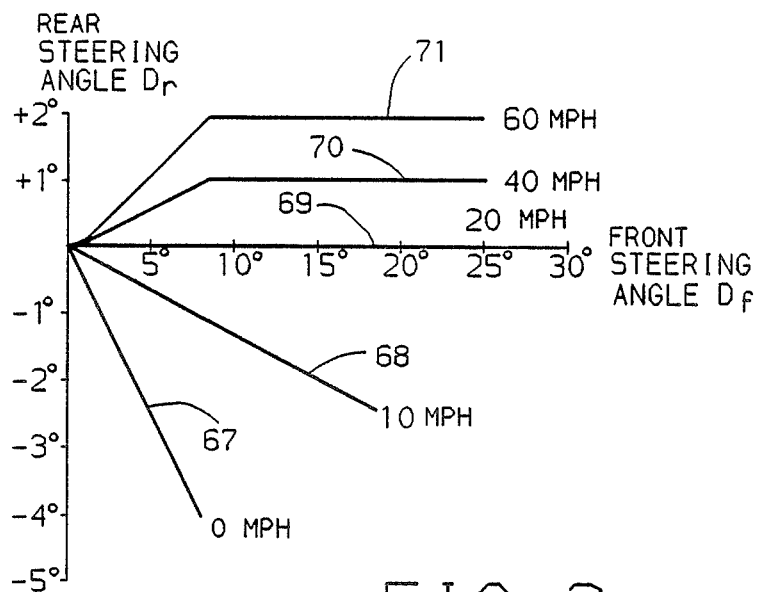

The default and normal operating relationships between the front and rear steering angles $D_f$, $D_r$ are depicted in FIGS. 2 and 3, respectively. In each case, the front steering angle $D_f$ is depicted as an absolute value or magnitude. A positive rear steering angle $D_r$ indicates that the rear wheels 28, 30 are to be steered in the same direction as or in-phase with the front wheels 12, 14; and a negative rear steering angle $D_r$ indicates that the rear wheels 28, 30 are to be steered in the opposite direction as or out-of-phase with the front wheels 12, 14.

Data defining the default trace 66 of FIG. 2 is stored within nonvolatile memory of control unit 52, referred to herein as a two-dimensional (2D) lookup table since there is one independent variable ($D_f$) and one dependent variable ($D_r$). In other words, the 2D table supplies a previously determined rear wheel steering angle command $D_r$ for any given front wheel steering angle $D_f$ without regard to other parameters such as vehicle speed $N_v$. As indicated, the rear steering is in-phase for front wheel steering angles of approximately ± 8 degrees or less and out-of-phase for larger front wheel steering angles.

The normal mode front/rear relationship is depicted in FIG. 3 as a family of traces 67–71, each corresponding to a different vehicle speed as indicated. Data defining such traces is stored within nonvolatile memory of control unit 52, referred to herein as a three-dimensional (3D) lookup table since there are two independent variables ($D_f$ and $N_v$) and one dependent variable ($D_r$). In other words, the 3D table supplies a previously determined rear wheel steering angle command $D_r$ for any given combination of front wheel steering angle $D_f$ and vehicle speed $N_v$. As shown by the traces 67–71, the rear steering is out-of-phase whenever the vehicle speed $N_v$ is less than 20 miles per hour (MPH) and in-phase whenever the vehicle speed $N_v$ is greater than 20 MPH. Significantly, the rear steering angle command $D_r$, and hence the ratio $D_f/D_r$, is variable with front steering angle $D_f$ as well as vehicle speed $N_v$ to provide any desired handling and stability characteristics.

Figure 4:
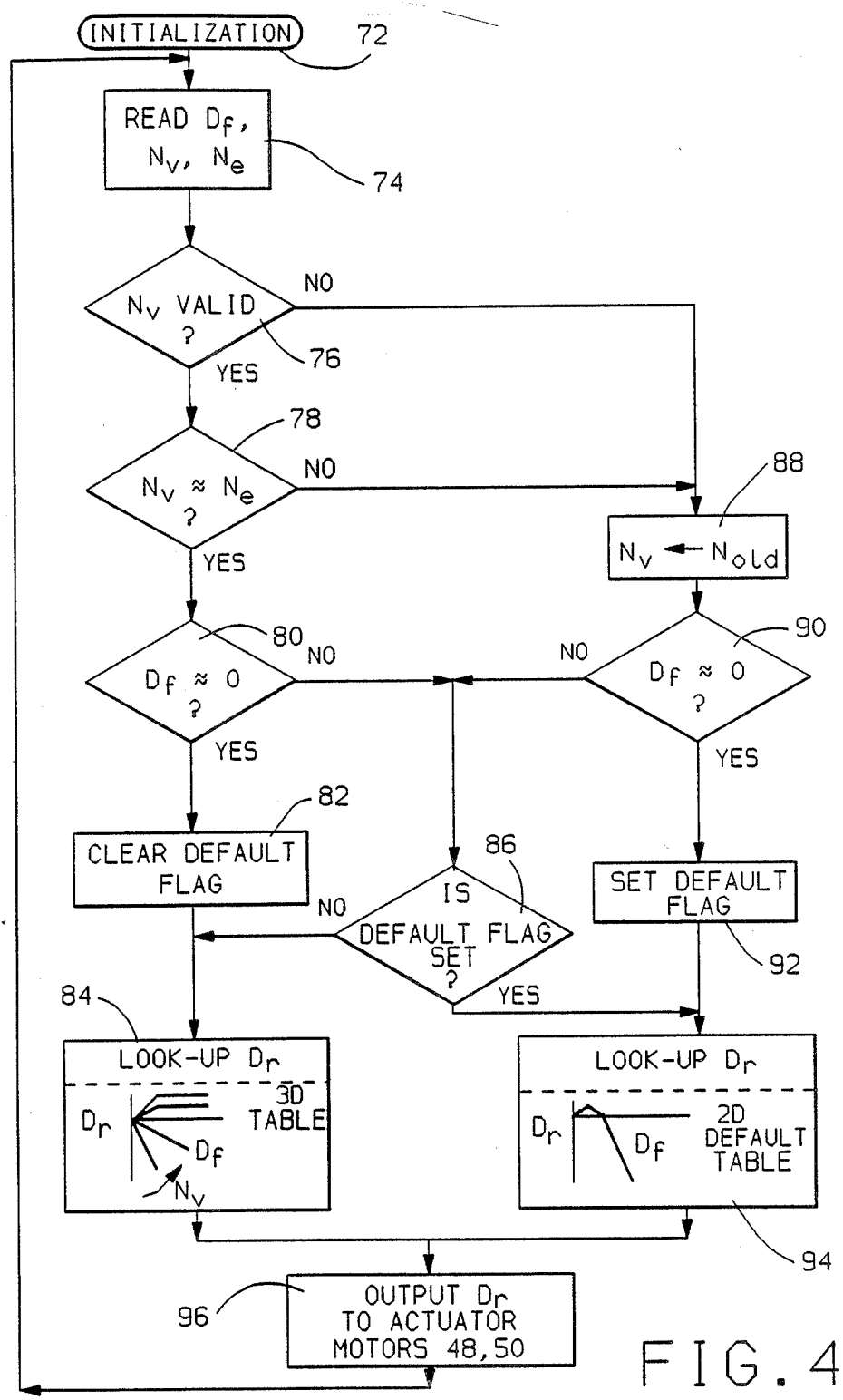
FIG. 4 is a flow diagram representative of suitable program instructions executed by the computer-based control unit of FIG. 1 in carrying out the control of this invention.

The flow diagram of FIG. 4 represents program instructions executed by the computer-based control unit 52 in carrying out the control method of this invention. The block 72 designates a series of initialization instructions executed at the initiation of each period of vehicle operation for initializing the various registers and timers of control unit 52. Thereafter, the blocks 74–96 are sequentially and repeatedly executed as indicated by the flow diagram lines.

Following initialization, the block 74 is executed to read the measured vehicle speed, engine speed and front steering angle signals $N_v$, $N_e$ and $D_f$ on lines 58, 60 and 62. The blocks 76 and 78 then analyze the vehicle speed value $N_v$ to determine its credibility. The block 76 checks for out-of-range and high rate-of-change signal values; block 78 compares the vehicle speed signal $N_v$ with the engine speed signal $N_e$ or other speed-related drivetrain signal. Normally, these tests will indicate a credible vehicle speed signal and the blocks 80–86 are executed as described below to retrieve a rear wheel steering angle command $D_r$ from the 3D lookup table as a function of both front wheel steering angle $D_f$ and vehicle speed $N_v$.

If any of the above-described tests indicate that the vehicle speed signal $N_v$ is not credible, the block 88 is executed to replace the current speed signal $N_v$ with an estimated or recently determined, credible speed signal $N_{old}$. The block 90 then determines if the front wheel steering angle signal $D_f$ is substantially zero, indicating straight ahead vehicle motion. If so, a DEFAULT flag is set by block 92 to indicate the failure condition, and the block 94 is executed to retrieve a rear wheel steering angle command $D_r$ from the 2D lookup table as a function of the front wheel steering angle $D_f$ without regard to the vehicle speed $N_v$. If the front steering angle is nonzero and the DEFAULT flag is not already set, as determined at blocks 90 and 86, the block 84 is executed to retrieve the rear wheel steering angle command $D_r$ from the 3D lookup table as a combined function of the front wheel steering angle $D_f$ and the replacement vehicle speed value $N_{old}$. Once the DEFAULT flag is set by a return of the front steering angle $D_f$ to zero, the block 86 is answered in the affirmative, and the rear steering angle command $D_r$ is thereafter determined from the 2D lookup table of block 94.

Thus, in the event that the vehicle speed signal is deemed not credible, the rear steering command $D_r$ is temporarily replaced with an estimated value for use in the 3D lookup until the the front wheels are substantially returned to the straight ahead position. Thereafter, the estimated vehicle speed value is no longer used and the rear steering angle command $D_r$ is determined as a sole function of the front steering angle $D_f$ using the 2D lookup table.

When the vehicle speed signal abnormality is corrected, the tests defined by blocks 76 and 78 will indicate a credible signal and the blocks 80–86 are executed to resume usage of the 3D lookup table once a zero position of the front wheels 12, 14 is detected. First, the block 80 is executed to determine if the front wheel steering angle is substantially zero. If not, and the DEFAULT flag is set, the rear steering angle command $D_r$ is retrieved from the 2D lookup table as a function of the front steering angle $D_f$. However, when the front steering angle is returned to the zero position, the blocks 82 and 84 are executed to clear the DEFAULT flag and retrieve the rear steering angle $D_r$ from the 3D lookup table as a combined function of the front steering angle $D_f$ and the vehicle speed $N_v$. In any event, the retrieved rear steering angle $D_r$ is then outputted as indicated by block 96 as a position command to the drivers (not shown) associated with the actuator motors 48 and 50.

While this invention has been described in reference to the illustrated embodiment, it is expected that various modifications will occur to those skilled in the art and that systems incorporating such modifications may fall within the scope of this invention, which is defined by the appended claims.

The embodiments of the invention in which an exclusive property or privilege is claimed are defined as follows:

1. A method of operation for a motor vehicle rear wheel steering control system in which rear wheels of the vehicle are positioned in accordance with a rear wheel steering angle command supplied thereto to control a heading of the vehicle, the method comprising the steps of:

periodically measuring a vehicle speed value;

developing the rear wheel steering angle command as a function of steering angle and a current vehicle speed value so long as said current vehicle speed value is deemed to be a reliable indicator of vehicle speed; and when the current vehicle speed value is not deemed to be a reliable indicator of vehicle speed, developing the rear wheel steering angle command as a function of the steering angle and a previous vehicle speed value deemed at the time of its measurement to be a reliable indicator of vehicle speed, at least when the steering angle indicates that the vehicle heading is changing.

2. A method of operation for a motor vehicle rear wheel steering control system in which rear wheels of the vehicle are positioned in accordance with a rear wheel steering angle command supplied thereto to control a heading of the vehicle, the method comprising the steps of:

periodically measuring a vehicle speed value;

establishing a normal mode of operation in which the rear wheel steering angle command is developed as a function of steering angle and a current vehicle speed value so long as said current vehicle speed value is deemed to be a reliable indicator of vehicle speed;

replacing the current vehicle speed value with a previous vehicle speed value deemed at the time of its measurement to be reliable indicator of vehicle speed if the current vehicle speed value is not deemed to be a reliable indicator of vehicle speed and the steering angle indicates that the vehicle heading is changing; and establishing a default mode of operation in which the rear wheel steering angle command is developed as a function of the steering angle without regard to the current and previous vehicle speed values once the steering angle indicates that the vehicle heading is substantially constant.

3. A method of operation for a motor vehicle rear wheel steering control system in which rear wheels of the vehicle are positioned in accordance with a rear wheel steering angle command supplied thereto to control a heading of the vehicle, the method comprising the steps of:

periodically measuring a vehicle speed value;

establishing a normal mode of operation in which the rear wheel steering angle command is developed as a function of steering angle and a current vehicle speed value so long as said current vehicle speed value is deemed to be a reliable indicator of vehicle speed;

replacing the current vehicle speed value with a previous vehicle speed value deemed at the time of its measurement to be a reliable indicator of vehicle speed if the current vehicle speed value is not deemed to be a reliable indicator of vehicle speed and the steering angle indicates that the vehicle heading is changing;

establishing a default mode of operation in which the rear wheel steering angle command is developed as a function of the steering angle without regard to the current and previous vehicle speed values when the steering angle indicates that the vehicle heading is substantially constant; and re-establishing the normal mode of operation when the current vehicle speed value is once again deemed to be a reliable indicator of vehicle speed and the steering angle indicates that the vehicle heading is substantially constant.

* * * * *